United States Patent
Stock et al.

(10) Patent No.: US 8,056,993 B2
(45) Date of Patent: Nov. 15, 2011

(54) SWITCHGEAR CABINET

(75) Inventors: Thomas Stock, Reiskirchen (DE); Juan Gutierrez, Herborn (DE); Sven Michael Laurösch, Haiger (DE); Marc Hartel, Reiskirchen (DE)

(73) Assignee: Rittal GmbH & Co. KG, Herborn (DE)

( * ) Notice: Subject to any disclaimer, the term of this patent is extended or adjusted under 35 U.S.C. 154(b) by 515 days.

(21) Appl. No.: 12/224,349

(22) PCT Filed: Mar. 2, 2007

(86) PCT No.: PCT/EP2007/001803
§ 371 (c)(1),
(2), (4) Date: Aug. 25, 2008

(87) PCT Pub. No.: WO2007/098955
PCT Pub. Date: Sep. 7, 2007

(65) Prior Publication Data
US 2009/0025954 A1    Jan. 29, 2009

(30) Foreign Application Priority Data
Mar. 4, 2006    (DE) .................. 10 2006 010 012

(51) Int. Cl.
    *A47B 47/00* (2006.01)
(52) U.S. Cl. ................ 312/329; 312/265.1; 312/223.1
(58) Field of Classification Search .... 312/265.1–265.4, 312/223.1, 257.1, 326, 329, 405; 52/656.4, 52/656.9, 455; 49/501; 174/520, 17 R, 559, 174/500
See application file for complete search history.

(56) References Cited

U.S. PATENT DOCUMENTS

| | | | | |
|---|---|---|---|---|
| 3,426,482 A | * | 2/1969 | Mock | 49/501 |
| 3,949,526 A | * | 4/1976 | Sherlock et al. | 49/501 |
| 5,020,866 A | * | 6/1991 | McIlwraith | 312/265.4 |
| 6,533,373 B2 | * | 3/2003 | Reuter et al. | 312/223.6 |
| 6,712,434 B2 | * | 3/2004 | Knab et al. | 312/265.4 |
| 6,820,952 B2 | * | 11/2004 | Austin et al. | 312/326 |
| 6,877,827 B2 | * | 4/2005 | Holighaus et al. | 312/223.1 |
| 6,952,889 B2 | * | 10/2005 | Yoo | 34/443 |
| 7,748,194 B2 | * | 7/2010 | Carless | 52/656.2 |
| 7,795,532 B2 | * | 9/2010 | Walker | 174/50 |
| 7,866,770 B2 | * | 1/2011 | Wu | 312/263 |
| 2004/0163323 A1 | * | 8/2004 | Herrmann et al. | 49/501 |

(Continued)

FOREIGN PATENT DOCUMENTS

DE        28 47 994 C2    5/1980

(Continued)

OTHER PUBLICATIONS

English translation of DE 3638407 from espace.net.*

*Primary Examiner* — Janet M Wilkens
*Assistant Examiner* — Daniel Rohrhoff
(74) *Attorney, Agent, or Firm* — Pauley Petersen & Erickson

(57) ABSTRACT

A switchgear cabinet including covering parts and at least one cabinet door mounted on a cabinet carcass by hinges and having a door frame including two vertical profiled elements and two horizontal profiled elements as well as corner pieces joining the profiled elements. In order to simplify the structure and assembly of the switchgear cabinet, hinge receptacles on which the hinges are mounted are supplied on or in the corner pieces of the same side of the door frame.

20 Claims, 7 Drawing Sheets

U.S. PATENT DOCUMENTS

2008/0272677 A1 * 11/2008 Francisquini .............. 312/257.1

FOREIGN PATENT DOCUMENTS

| | | |
|---|---|---|
| DE | 37 00 778 A1 | 7/1987 |
| DE | 37 06 797 A1 | 9/1987 |
| DE | 36 38 407 A1 | 5/1988 |
| DE | 40 22 079 A1 | 1/1992 |
| DE | 297 23 271 U1 | 8/1998 |
| DE | 101 04 215 A1 | 8/2002 |
| EP | 0 793 320 A1 | 9/1997 |
| EP | 0 818 861 A1 | 1/1998 |
| GB | 2 345 940 A | 7/2000 |
| NL | 8201312 | 10/1983 |
| WO | WO 00/65188 | 11/2000 |

* cited by examiner

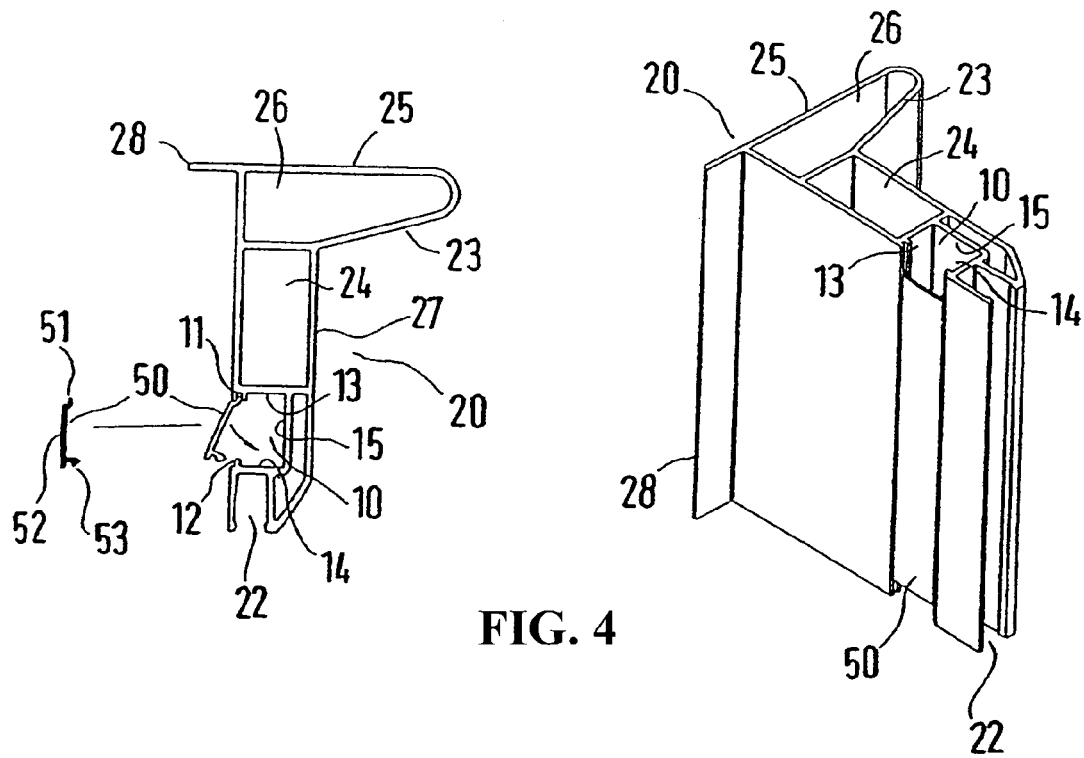
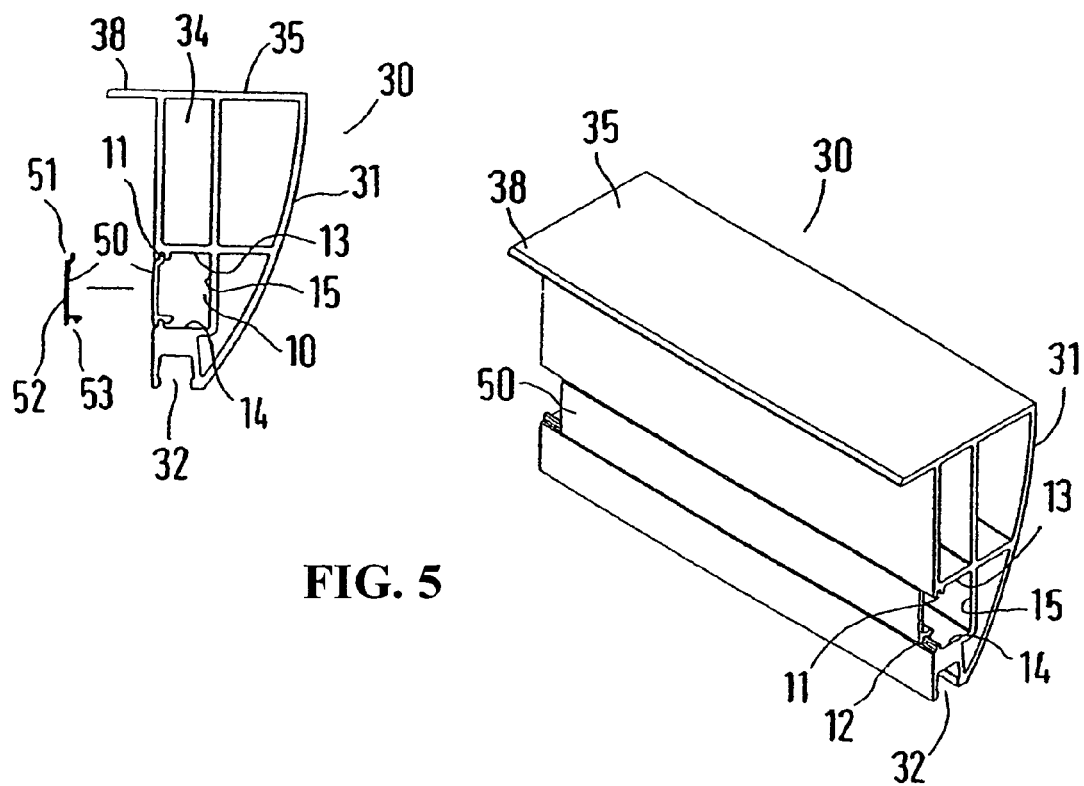
FIG. 4
FIG. 5

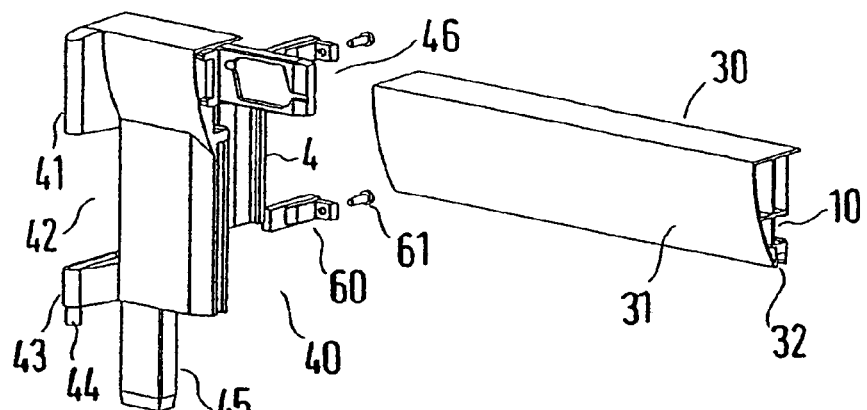
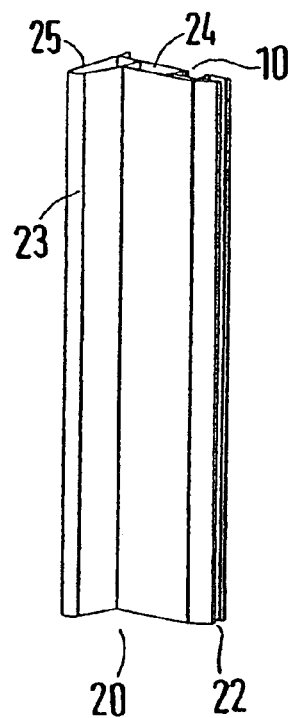
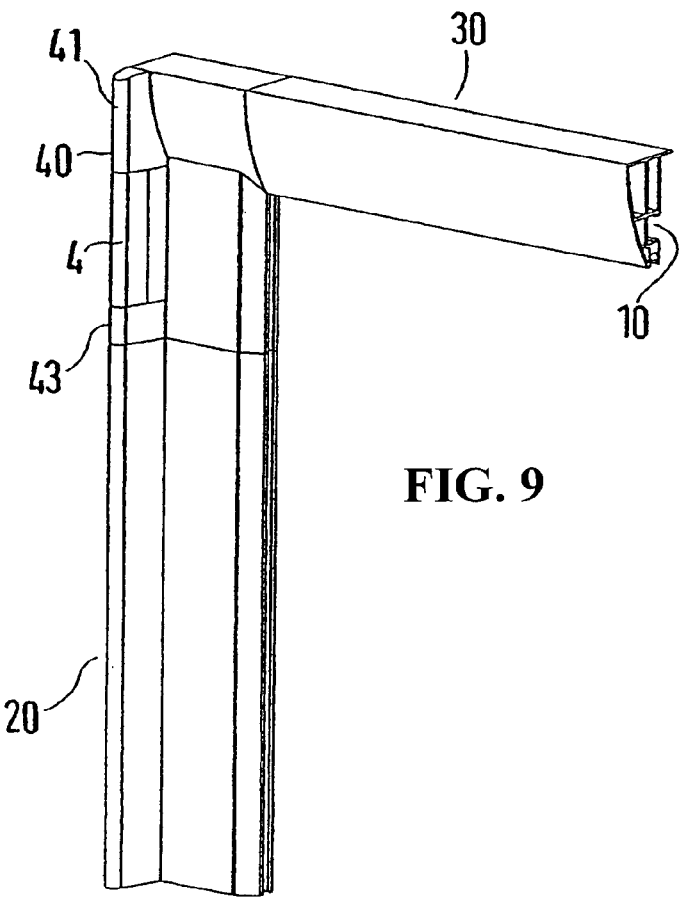
FIG. 8
FIG. 9

SWITCHGEAR CABINET

BACKGROUND OF THE INVENTION

1. Field of the Invention

This invention relates to a switchgear cabinet with covering elements and at least one cabinet door attached to the body of the cabinet by hinges, which door has a door frame made of two vertical profiled elements and two horizontal profiled elements and corner pieces connecting them.

2. Discussion of Related Art

A switchgear cabinet is taught by German Patent Reference DE 28 47 994 C2. There, a door of the switchgear cabinet has a door frame with an inserted door leaf. The door of the switchgear cabinet is hingedly attached to the frame of the switchgear cabinet by hinges, wherein the hinges are received in a frame by a hinge part. For this purpose, the portion of the frame receiving the hinge parts is adapted in a particular way to a section of the hinge parts, which involves a corresponding cost outlay. The profiled elements forming the door frame are beveled in the corner areas and put together by corner connectors in order to clamp the profiled frame sections with respect to each other. No specific information is provided in regard to the corner connectors.

A switchgear cabinet disclosed by German Patent Reference DE 29723 273 U1, has a door frame made of hollow profiled sections, which are connected with each other at right angles by corner pieces, and is attached to the back of the door facing the switchgear cabinet interior, but no detailed information regarding the embodiment of the corner pieces is provided. Hinge elements are attached to the back of the door leaf outside of a circumferential seal, while further hinge elements, which are hingedly connected therewith are fixed in place on an adjoining vertical frame leg of the switchgear cabinet.

SUMMARY OF THE INVENTION

One object of this invention is to provide a switchgear cabinet of the type mentioned above but which permits the manufacture of the door frame in the simplest possible manner and offers increased options for use, along with simple assembly.

This object is attained with characteristics taught in this specification and in the claims. Here, hinge receptacles, to which hinges are attached, are provided on or in the corner pieces.

With these steps, substantial functions of the door frame are transferred to the corner pieces, so that the profiled sections of the door frame do not require extensive working, and assembly is easier.

For a stable, unequivocal introduction of the respective hinge section, the receptacles are embodied as cutouts in an exterior side remote from the frame interior.

The step, wherein a hinge element is embodied in the corner piece, contributes to a simple construction.

If the corner piece has at least one profiled section, in which a rotational shaft of the hinge is arranged and which protrudes beyond the front plane of a door opening of the switchgear cabinet, it is possible to provide the door with a wide opening range without elaborate measures.

A simple structure of the door frame and of the hinges is also aided if a hinge element, which is connected with the cabinet body, has bearing pins, which are rotatably seated on the corner piece.

Here, in one design of an embodiment of the hinge, the bearing pins are seated in the at least one profiled section provided with bearing sections and are rotatably fixed in place by bearing pieces introduced into the bearing section. Hinge eyes are provided in the corner piece by these steps, wherein the latter is complemented by the bearing elements.

Unequivocal stable positioning of the corner pieces and the connection of the associated profiled sections is achieved if the corner pieces have holding pins for the connection with the associated profiled vertical elements and profiled horizontal elements which, in the assembled state of the door frame, are introduced into a respective profiled chamber of the profiled vertical element and profiled horizontal element and are fixed in place therein, wherein a cross section of the holding pins is matched to the cross section of the profiled chambers.

In this case, a dependable fixation in place results if the holding pins are fixed in place in the profiled chambers by screws, which are turned crosswise into the profiled chambers and the holding pins, or are glued in or welded on to fix in place.

Definite seating, along with a stable connection, are aided if the profiled vertical elements and profiled horizontal elements are embodied as multi-chambered hollow profiled elements, wherein the profiled chambers receiving the holding pins have a rectangular-shaped cross section. In this case it is advantageous if, for insertion, the end sections of the holding pins are approximately conically tapered.

Those steps are advantageous for the unhampered attachment of assembly pieces, for example seals or installation elements, such as of a locking device, in which the back of the profiled vertical elements and of the profiled horizontal elements facing the cabinet interior and of the corner pieces connecting them is embodied as flat and parallel with the plane of the door, and wherein the rear profiled wall delimits the respective profiled chamber at the rear.

Advantageous mounting possibilities, for example for the locking device, result at the front side if at least the profiled vertical elements have a flat profiled section on their front side, which extends parallel with respect to the plane of the door, delimits the respectively profiled chamber at the front and is adjoined toward the exterior of the door frame by the profiled section, which projects from the front and is closed off on its exterior by a flat exterior wall, which is connected at right angles with the back wall.

A defined flat delimitation of the door frame on its exterior is obtained if the profiled horizontal elements have a flat exterior wall on the exterior of the door frame, which adjoins the back wall at right angles and makes a transition at its front end into a convexly forward curved wall at the front, which extends as far as the interior of the profiled horizontal element which delimits the clear area of the frame.

Further advantages in connection with the corner piece are obtained if the corner piece has a horizontal leg, which is at least matched to the exterior cross section of the profiled horizontal element, and a vertical leg, which is at least matched to the exterior cross section of the profiled vertical element, and if cable conduits, which are open toward the back of the door frame and can be closed with a removable cover and are arranged in such a way, that they make continuous transitions into each other, are formed in the profiled vertical elements and the profiled horizontal elements, as well as in the horizontal leg and the vertical leg of the corner pieces. Here, the corner piece provides advantageous transitions between the cable conduits and the adjoining profiled sections.

BRIEF DESCRIPTION OF THE DRAWINGS

This invention is explained in greater detail in view of exemplary embodiments, making reference to the drawings, wherein:

FIG. 4 shows a section of a profiled vertical element of the door in accordance with FIG. 1, in a perspective plan view and in cross section;

FIG. 5 shows a section of a profiled horizontal element of the door in accordance with FIG. 1, in a perspective plan view and in cross section;

FIG. 8 shows a corner area of the frame in accordance with FIG. 7A, in an exploded perspective front view;

FIG. 9 shows the corner area in accordance with FIG. 8, in the assembled state in a perspective front view;

DETAILED DESCRIPTION OF THE INVENTION

Figure 1:
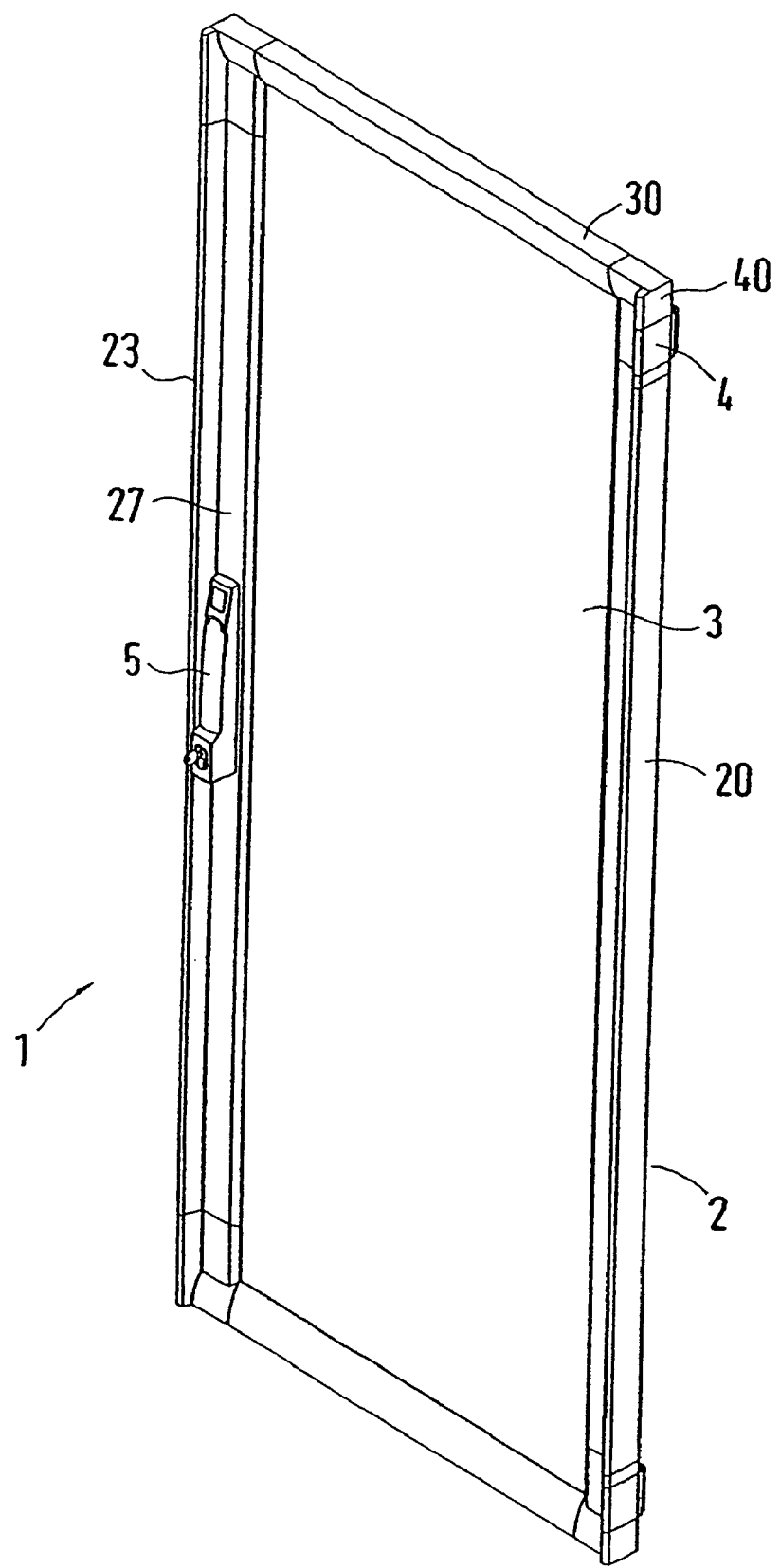
FIG. 1 shows a door with a door frame and door leaf in a perspective plan view.

FIG. 1 shows a door 1 for a switchgear cabinet, having a door leaf 3, for example a transparent glass pane or other material, also opaque if desired, contained in a door frame 2. On the front of the door frame facing away from the cabinet interior, see FIG. 6, an exterior portion of a locking device 5 is attached to one of the two profiled vertical elements 20, while on the other vertical side, namely on the exterior 25 remote from the clear frame area in which the door leaf 3 is inserted, hinges 4 are attached in the area of an upper and a lower corner piece 40. Corner pieces 40 are also inserted in the other two corners between an upper and a lower profiled horizontal element 30 and the respective profiled vertical element 20.

Figure 2A:
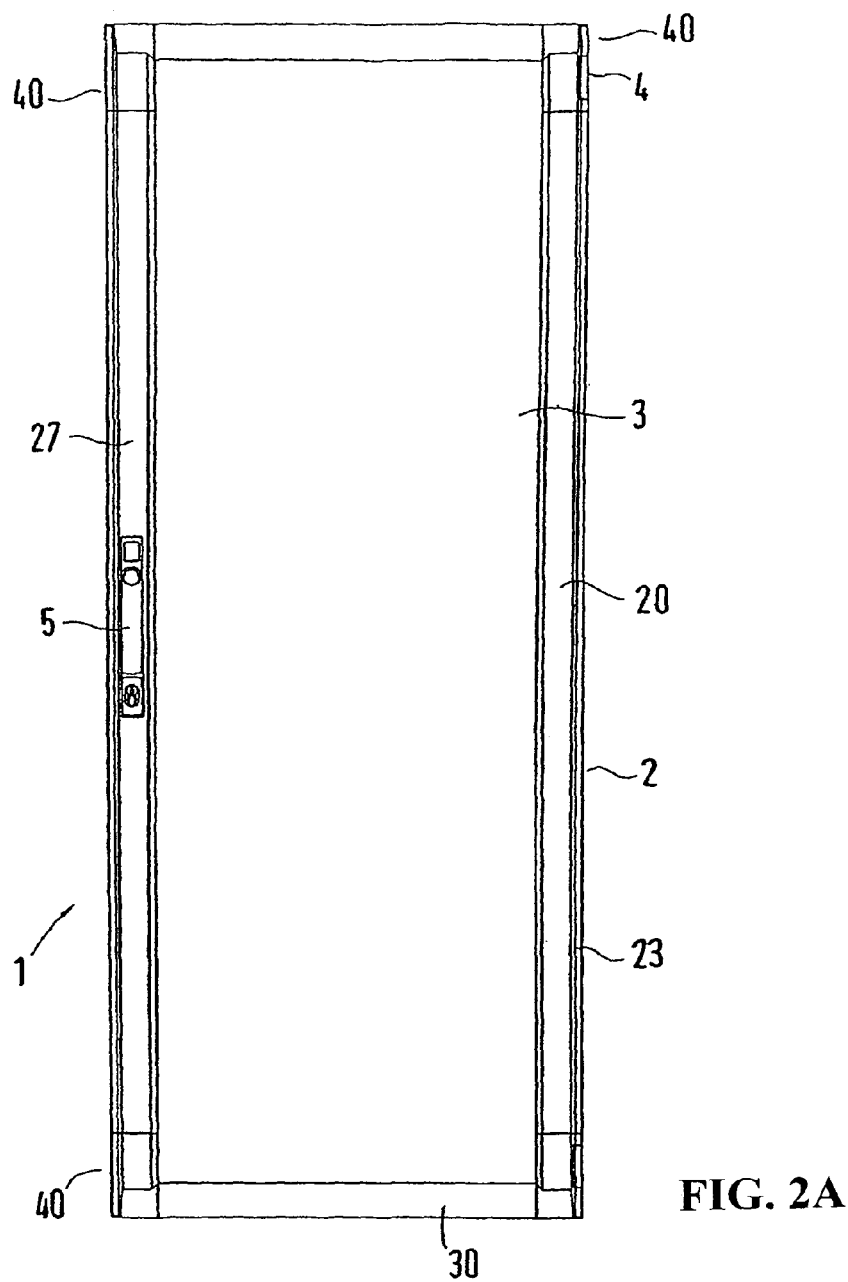
FIGS. 2A and 2B, show the door in accordance with FIG. 1 in a front view and in a top view, respectively.
Figure 2B:
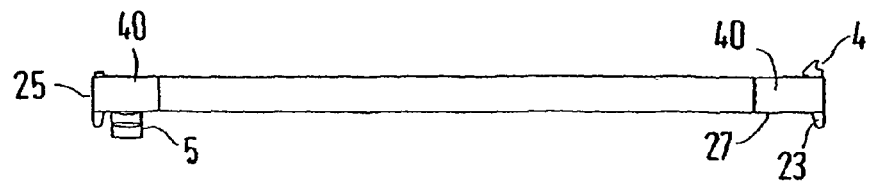
Figure 6:
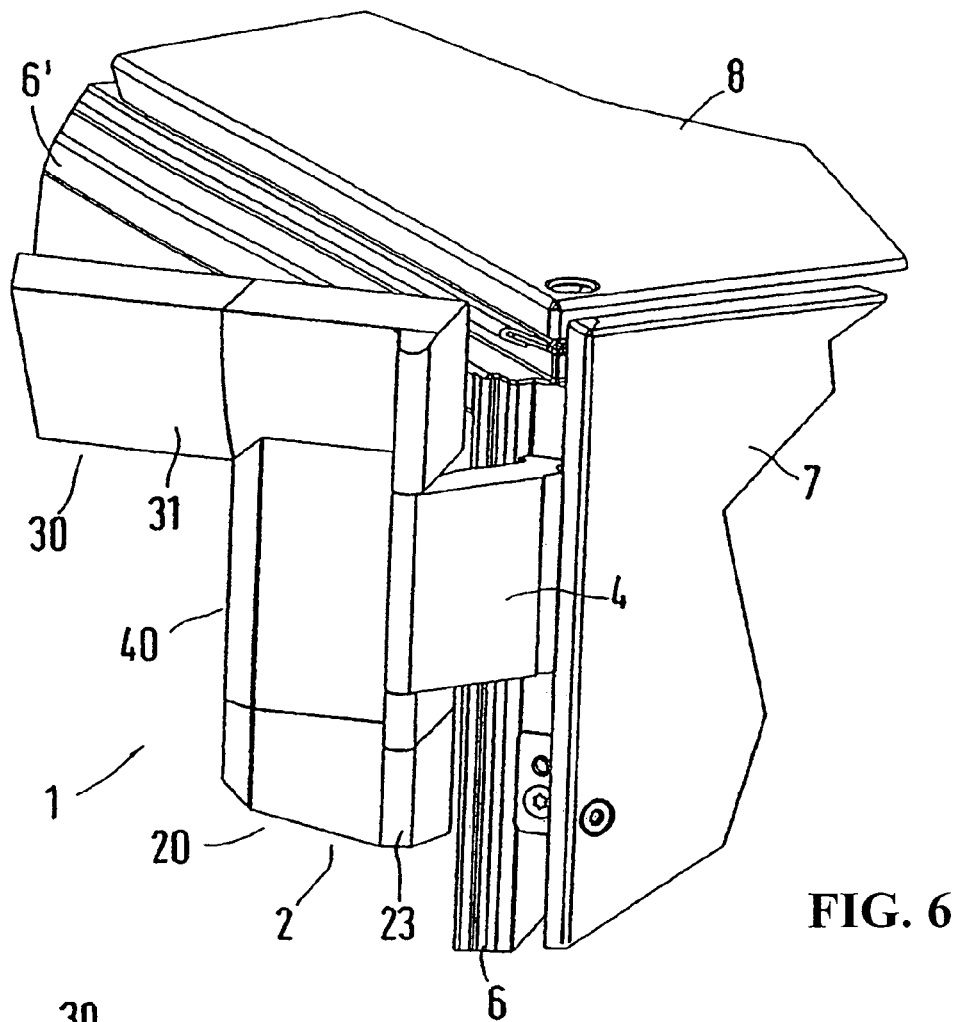
FIG. 6 shows a corner area of a switchgear cabinet with a partially open door in accordance with FIG. 1, in a perspective plan view.

FIG. 2A shows the door in accordance with FIG. 1 in a front view, while FIG. 2B shows the door in accordance with FIG. 1 in a top view. As shown, adjoining the flat respective exterior lateral surface 25, the two profiled vertical elements 20 have a profiled section 23 protruding in a hump shape toward the front, which is adjoined by a flat profiled section 27 and offers advantageous mounting options, for example for the locking device 5. The hump-shaped profiled section 23 contributes to stability and torsional rigidity, and also results in an arrangement of the center of rotation of the hinge which is placed far to the front, so that the door can be opened wide, for example over 180° or more, without hindrance, as shown in FIG. 6.

Figure 3:
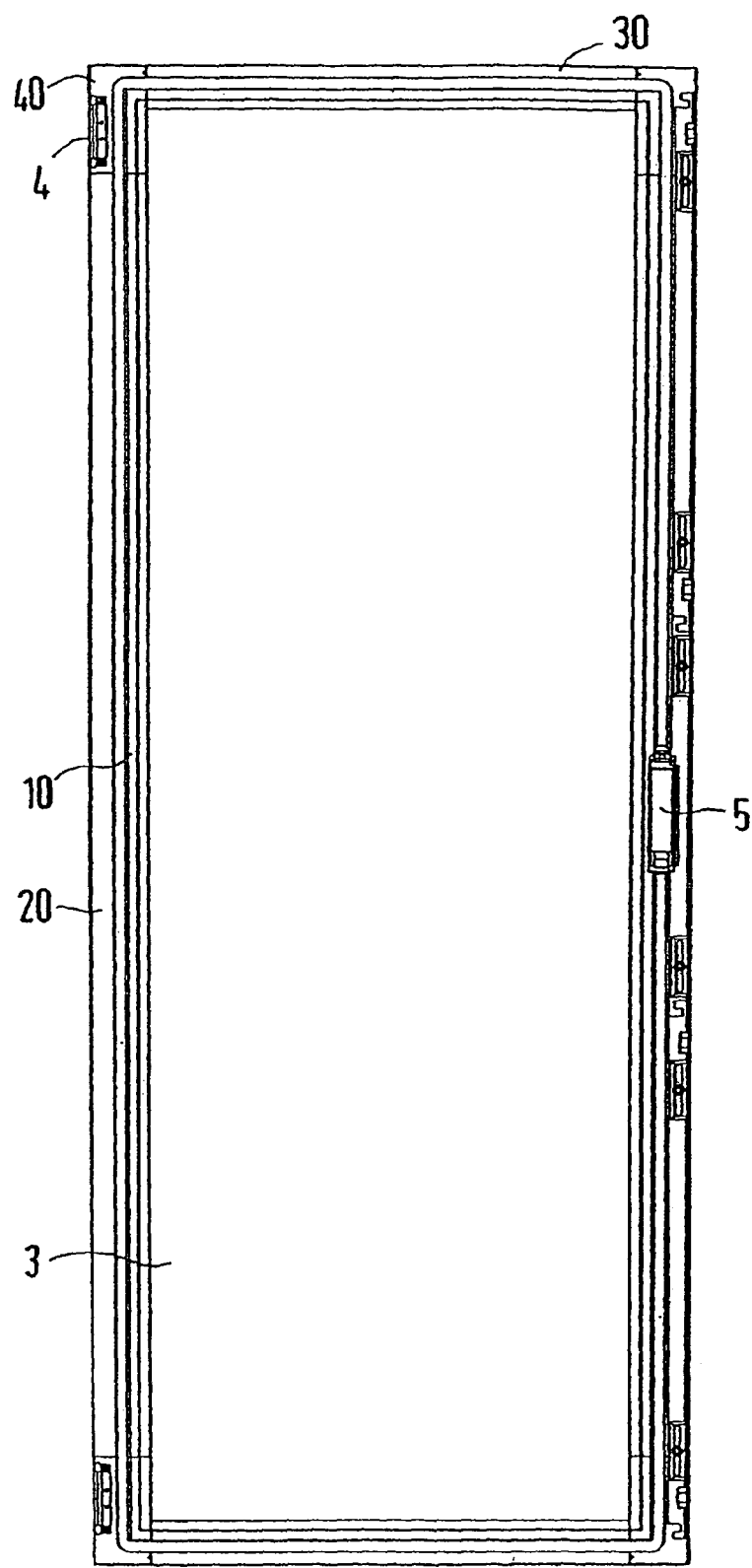
FIG. 3 shows the door in accordance with FIG. 1 in a rear view.

FIG. 3 shows the door 1 from its back, facing the switchgear cabinet interior, in which the locking elements of the locking device 5 located on the inside, and also the hinges 4, are shown. A circumferential cable conduit 10 can also be seen, which is open, or can be opened, toward the inside of the door frame 2 and has a cover, see FIGS. 4 and 5, and extends over the length of the profiled vertical elements 20 and the profiled horizontal elements 30, and a connection is provided via the corner pieces 40.

The profiled vertical elements 20 are perspectively shown in FIG. 4 in a section and in a cross section. Toward the interior, the profiled section 23, which protrudes in a hump shape toward the front and is rounded toward the front in cross section, adjoins the flat exterior side 25 facing away from the clear area of the frame and surrounds a hollow chamber 26, which is closed off toward the back of the profiled vertical section 20 by a flat wall section extending as far as the inside surrounding the clear area and is only interrupted by the opening side of the cable conduit 10, into whose opening side a cover 50 is inserted flush with the interior surface. The flat exterior lateral surface 25, or exterior wall, which is oriented at right angles with respect to the back, and thus also to the plane of the door, continues beyond the interior surface with a free end section 28. The flat profiled section 27 adjoins the hump-shaped profiled section 23 in the direction toward the interior, extends parallel with the flat back of the profiled element, or respectively the plane of the door, and makes a transition via an inclined portion into the interior of the profiled vertical element surrounding the clear area. A receiving groove 22, open toward the clear area, is arranged on the interior of the profiled element for receiving the edge of the door leaf 3, so that the door leaf 3 is securely received, if desired along with the employment of a seal, by the vertical and horizontal profiled frame sections pushed vertically with respect to the edge of the door leaf 3 in the direction of the plane of the door and are completed to form the finished frame by the corner connectors 40. The front leg of the groove is also supported toward the front by the wall of the flat profiled section. A lateral wall section 14 of the cable conduit 10 adjoins the groove bottom of the receiving groove 22, and its base wall 15 extends parallel with the plane of the door and also with the flat profiled section 27, as well as the flat back of the profiled element. The other lateral wall section of the cable conduit, which is rectangular in cross section, delimits at the same time a rectangular profiled chamber 24, which is delimited by the back of the profiled element, or respectively by the back wall located there, and toward the front by the flat profiled section 27, and is separated by a further chamber wall from the hollow chamber 26. In the edge area of the opening of the cable conduit, the one lateral wall section 13 has a holding groove 11 extending along and parallel with the back, while the oppositely located lateral wall section 14 has a holding strip 12 located opposite the groove and also extending longitudinally. The cover 50 is inserted into the holding groove 11 by a plug-in edge 51, which is set back with respect to the cover surface 52 by the thickness of the outside-located groove leg, this insertion into the groove takes place obliquely, and the play of the plug-in edge 51, or the elasticity of the cover 50, is sufficient to make an oblique insertion possible. The other longitudinal edge of the cover 50 facing the holding strip 12 has a snap-in edge 53, which has an oblique insertion section or insertion curvature and a snap-in groove matched to the holding strip 12. The cover 50 is sufficiently elastic for snapping into the area of the snap-in edge 53 and/or of the cover section 52, in particular if the cover is made of a plastic material.

FIG. 5 shows the profiled horizontal elements 30 in greater detail, namely by sections in a perspective plan view and in cross section. Here, the exterior lateral surface 35 facing away from the clear area of the frame is flat and extends at right angles with respect to the back, also flat, which is oriented parallel with the plane of the door. The flat exterior lateral surface 35, or respectively the exterior wall section containing it, also projects with a free end section 38 over the back surface. At the front edge, the exterior lateral surface 35 makes a transition into a convexly forward curved front 31, which extends as far as the leg on the front side of a receiving groove 32 for the door leaf 3 on the interior, which delimits the clear frame area and extends over several chambers on the front. The receiving groove 32 is located in the same plane as the receiving groove 22 of the profiled vertical elements and is inwardly delimited by a rear leg on the back of the profiled horizontal element 30 located in the cabinet interior. The cable conduit 10 is also in a rectangular shape in cross section, corresponding to the cable conduit in the profiled vertical elements 20, and the one lateral wall section 14 is delimited by the back of the receiving groove 32. The other lateral wall section 13 delimits a rectangularly-shaped profiled chamber 34 toward the interior, which is delimited on the outside by the outside of the exterior lateral surface 35. The opening side and the base wall 15 of the cable conduit 10 are located in the same plane parallel with the plane of the door as in connection with the profiled vertical elements 20. The opening side is covered in the same way as the profiled vertical elements 20 by the cover 50, which is fixed in place by respective holding elements, holding groove 11 and holding strip 12. The front-located delimiting wall of the rectangularly-shaped profiled chamber 34 is located in the same plane parallel with the plane of the door as the base wall 15 of the cable conduit 10. Thus, two further hollow chambers, separated from each other by a strip, result at the front of the cable conduit 10 and the profiled chamber 34, which contribute to the reinforcement of the profiled horizontal element.

FIG. 6 shows the door 1 of a switchgear cabinet in the installed state, where the door frame 2 is pivotably connected via hinges 4 with the cabinet body by a frame 6 of horizontal and vertical frame legs 6, 6'. The body of the cabinet is preferably tightly closed by covering elements, in particular lateral walls 7 and a cover 8 and possibly a rear wall (not represented), provided it is not embodied as a door. The hinge 4 is attached to the door frame 2 in the area of or near the corner piece 40 and is screwed via a massive intermediate piece and an oblique connecting section to a mounting surface, which extends obliquely with respect to the outer edge, of the vertical frame leg in a free space formed in the edge area. A cutout 42, see FIG. 8, is cut in the area of the hinge 4 on the exterior of the corner piece 40. The hinge axis is arranged in the profiled section 23 of the hump-shaped corner piece protruding toward the front, which makes a flush transition into the hump-shaped profiled section 23 of the profiled vertical element 20, namely in the curvature. The hump-shaped profiled sections 23 of the corner piece 40 are in a form of a hump-shaped upper bearing section 41 and a hump-shaped lower bearing section 43, as represented in FIG. 8.

Figure 7:
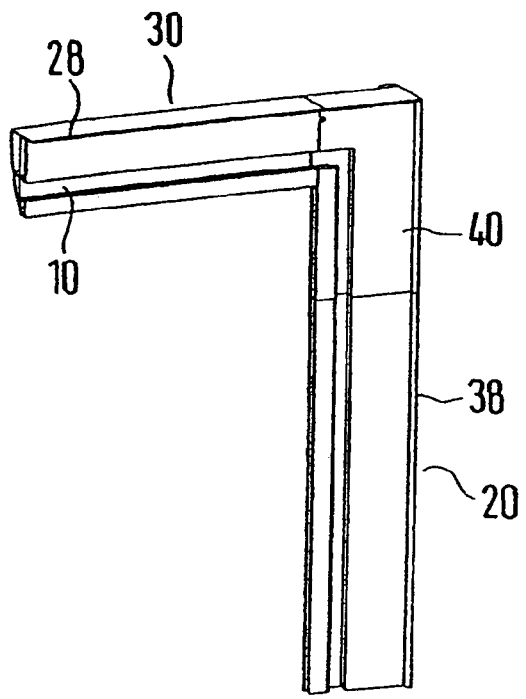
FIG. 7 shows a corner area of a door frame in accordance with FIG. 1, with a separate corner piece in a perspective plan view.

FIG. 7 shows a corner area of the door frame 2 from the rear, where the respective profiled vertical element 20 and profiled horizontal element 30 are connected with each other by the respective corner piece 40. It can be seen that the cable conduit 10 of the profiled vertical element 20 extends continuously into the cable conduit of the profiled horizontal element 30 via a vertical and a horizontal conduit section of the corner piece 40. The free end sections 28 and 38 of the profiled vertical element 20 and the profiled horizontal element 30 are also continued via adjoining vertical and horizontal free end sections of the corner piece 40 and form an edge which is closed all around, which can be used, for example, for the attachment or protection of mounting elements or of a seal on the back.

Figure 10:
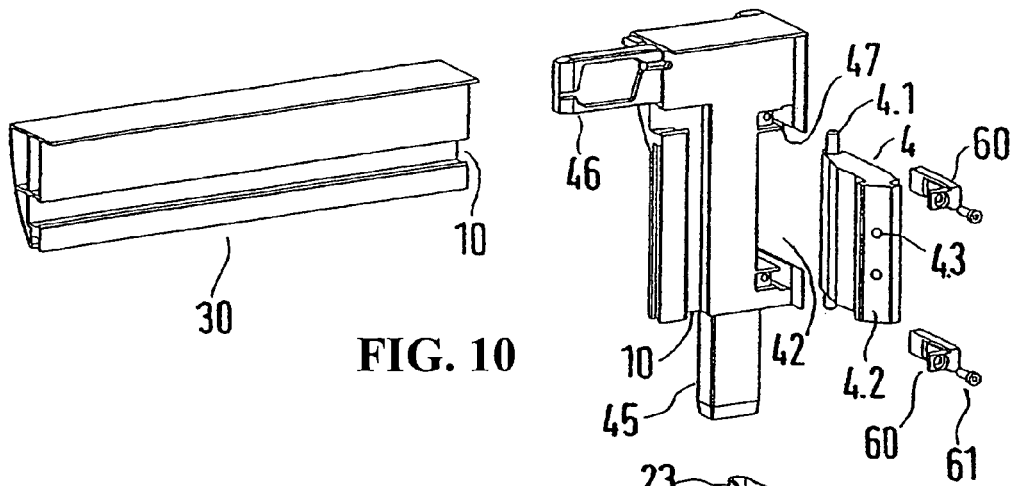
FIG. 10 shows the corner area of the frame in accordance with FIG. 8, in an exploded perspective rear view.

As FIG. 8 shows, the connection of the corner piece 40 with the profiled horizontal element 30 and the profiled vertical element 20 takes place by holding pins 45, 46 attached to the corner piece 40, which are matched to the cross section of the profiled chamber 24 of the profiled vertical element 20, or respectively of the profiled chamber 34 of the profiled horizontal element 30, and are slightly beveled at their ends for easy insertion. Secure fixing in place is provided by a screw turned transversely in the insertion direction, or by gluing or welding. Further securing is the result of a further pin-like holding element 44 on the corner piece 40, which enters into the hump-shaped profiled section 23 of the profiled vertical element 20. The hinge 4 is secured in the cutout 42 by bearing pieces 60 and is rotatably seated, while the bearing pieces 60 are fixed in place by fastening elements 61 in the form of screws and protrude from the direction of the rear into the hump-shaped bearing section 41, or respectively 43, as FIG. 10 shows by way of clarification. FIG. 9 shows the inserted corner piece 40 from the direction of the front.

FIG. 10 shows a plug-in receiver 47 for introducing the bearing piece 60 for fixing a bearing pin 4.1 in place in the bearing section 41. The other lower bearing pin 4.1 is correspondingly rotatably fixed in place in the lower bearing section 43. For rotary seating, the bearing pieces 60 have a concave curvature on their front insertion side, which is matched to the curvature of the bearing pins 4.1. The mounting section 4.2 is brought into contact with the inclined face of the vertical frame leg and is fixed in place on the vertical frame leg by screws via a fastening element 4.3 in the form of threaded bores.

Figure 11:
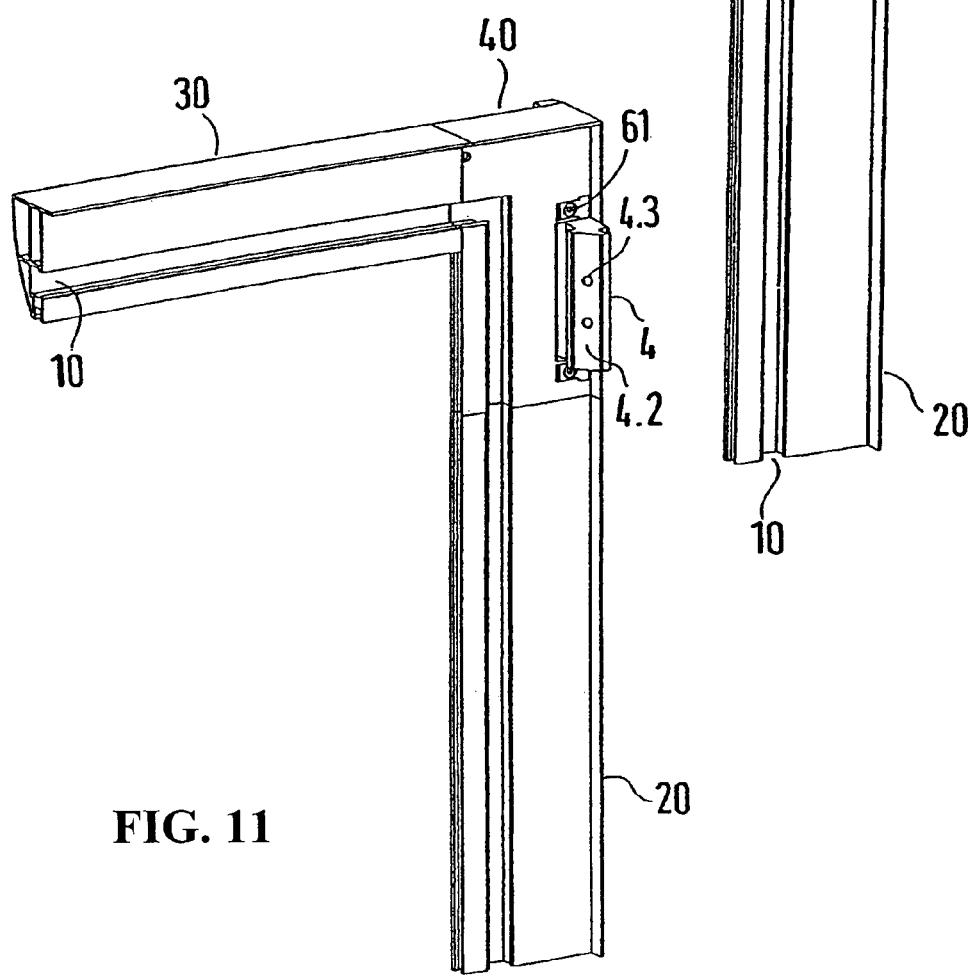
FIG. 11 shows the corner area of the door frame in accordance with FIG. 10, in an assembled representation.

FIG. 11 shows the corner piece 4 mounted on the profiled vertical element 20 and the profiled horizontal element 30, along with the hinge 4 mounted thereon by the bearing piece 60 and a fastening element 61. Here, too, it is possible to see how the cable conduit 10 makes a transition from the profiled vertical element 20 via the corner piece 40 into the cable conduit of the profiled horizontal element 30.

The cable can be inserted into the cable conduit 10 from the interior of the switchgear cabinet, in particular in the area of the vertical side provided with the hinges 4, and from there routed, for example, to the electronically operable door lock or to display elements in order to operate actuators, or respectively to trigger display elements. In the opposite way, it is also possible to transmit sensor signals to a monitoring device via cables 10 routed through the cable conduit.

The invention claimed is:

1. A switchgear cabinet with covering elements (7, 9) and at least one cabinet door (1) attached to a body of the cabinet by hinges (4), wherein the cabinet door has a door frame (2) made of two vertical profiled elements (20) and two horizontal profiled elements (30) and connecting corner pieces (40), the switchgear cabinet comprising:
    hinge receptacles, to which the hinges (4) are attached provided on or in the corner pieces (40), and
    a profiled section disposed along an outer side edge of each of the vertical profiled elements (20) and the corner pieces (40), the profiled section disposed on a front side of the switchgear cabinet, protruding outward toward a front of the switchgear cabinet, and having a flush transition to adjacent profiled sections, wherein on at least one side of the switchgear cabinet the profiled section of each of the corner pieces (40) includes one of the hinge receptacles, in which the rotational shaft of one of the hinges (4) is arranged.

2. The switchgear cabinet in accordance with claim 1, wherein the hinge receptacles are cutouts (42) in the profiled section.

3. The switchgear cabinet in accordance with claim 2 wherein a hinge element connected with the cabinet body has bearing pins (4.1) which are rotatably seated on the corner piece (40).

4. The switchgear cabinet in accordance with claim 3, wherein the bearing pins (4.1) are seated in the profiled section with bearing sections (41, 43) and are rotatably fixed in place by bearing pieces (60) introduced into the bearing section (41, 43).

5. The switchgear cabinet in accordance with claim 4, wherein the corner pieces (40) have holding pins (45, 46) for a connection with the associated profiled vertical elements (20) and profiled horizontal elements (30) which in an assembled state of the door frame (2) are introduced into a respective profiled chamber (24, 34) of the profiled vertical element (20) and profiled horizontal element (30) and are therein fixed in place, wherein a first cross section of the holding pins (45, 46) is matched to a second cross section of the profiled chambers (24, 34).

6. The switchgear cabinet in accordance with claim 5, wherein the holding pins (45, 46) are fixed in place in the profiled chambers (24, 34) by screws turned crosswise into the profiled chambers (24, 34) and the holding pins (45, 46), or by being glued in or welded on.

7. The switchgear cabinet in accordance with claim 5, wherein the profiled vertical elements (20) and profiled horizontal elements (30) are multi-chambered hollow profiled elements, wherein the profiled chambers (24, 34) receiving the holding pins (45, 45) have a rectangular-shaped cross section.

8. The switchgear cabinet in accordance with claim 6, wherein the profiled vertical elements (20) and profiled horizontal elements (30) are multi-chambered hollow profiled elements, wherein the profiled chambers (24, 34) receiving the holding pins (45, 45) have a rectangular-shaped cross section.

9. The switchgear cabinet in accordance with claim 8, wherein the back of the profiled vertical elements (20) and of the profiled horizontal elements (30) facing the cabinet interior and of the connecting corner pieces (40) is flat and parallel with a plane of the door, and a rear profiled wall delimits the respective profiled chamber (24, 34) at the rear.

10. The switchgear cabinet in accordance with claim 9, wherein at least the profiled vertical elements (20) have a flat profiled section (27) on a front side which extends parallel with respect to the plane of the door, delimits the respectively profiled chamber (24) at the front and is adjoined toward an exterior of the door frame (2) by the profiled section (23), which projects from the front and is closed off on an exterior by a flat exterior wall connected at right angles with a back wall.

11. The switchgear cabinet in accordance with claim 10, wherein the profiled horizontal elements (30) have a flat exterior wall on the exterior of the door frame (2) which adjoins the back wall at right angles and makes a transition at a front end into a convexly forward curved wall at the front, which extends as far as an interior of the profiled horizontal element (30) which delimits the clear area of the frame.

12. The switchgear cabinet in accordance with claim 11, wherein the corner piece (40) has a horizontal leg at least matched to a first exterior cross section of the profiled horizontal element (30), and a vertical leg at least matched to a second exterior cross section of the profiled vertical element (20), and cable conduits (10) which are open toward the back of the door frame (2) and are closeable with a removable cover (50) and are arranged for continuous transitions into each other are formed in the profiled vertical elements (20) and the profiled horizontal elements (30), and in the horizontal leg and the vertical leg of the corner pieces (40).

13. The switchgear cabinet in accordance with claim 1, wherein a respective hinge element is in the corner piece (40).

14. The switchgear cabinet in accordance with claim 1, wherein a hinge element connected with the cabinet body has bearing pins (4.1) which are rotatably seated on the corner piece (40).

15. The switchgear cabinet in accordance with claim 1, wherein the corner pieces (40) have holding pins (45, 46) for a connection with the associated profiled vertical elements (20) and profiled horizontal elements (30) which in an assembled state of the door frame (2) are introduced into a respective profiled chamber (24, 34) of the profiled vertical element (20) and profiled horizontal element (30) and are therein fixed in place, wherein a first cross section of the holding pins (45, 46) is matched to a second cross section of the profiled chambers (24, 34).

16. The switchgear cabinet in accordance with claim 1, wherein the back of the profiled vertical elements (20) and of the profiled horizontal elements (30) facing the cabinet interior and of the connecting corner pieces (40) is flat and parallel with a plane of the door, and a rear profiled wall delimits the respective profiled chamber (24, 34) at the rear.

17. The switchgear cabinet in accordance with claim 1, wherein at least the profiled vertical elements (20) have a flat profiled section (27) on a front side which extends parallel with respect to a plane of the door, delimits the respectively profiled chamber (24) at the front and is adjoined toward an exterior of the door frame (2) by the profiled section (23), which projects from the front and is closed off on an exterior by a flat exterior wall connected at right angles with a back wall.

18. The switchgear cabinet in accordance with claim 1, wherein the profiled horizontal elements (30) have a flat exterior wall on the exterior of the door frame (2) which adjoins a back wall at right angles and makes a transition at a front end into a convexly forward curved wall at a front, which extends as far as an interior of the profiled horizontal element (30) which delimits a clear area of the frame.

19. The switchgear cabinet in accordance with claim 1, wherein the corner piece (40) has a horizontal leg at least matched to a first exterior cross section of the profiled horizontal element (30), and a vertical leg at least matched to a second exterior cross section of the profiled vertical element (20), and cable conduits (10) which are open toward a back of the door frame (2) and are closeable with a removable cover (50) and are arranged for continuous transitions into each other are formed in the profiled vertical elements (20) and the profiled horizontal elements (30), and in the horizontal leg and the vertical leg of the corner pieces (40).

20. A switchgear cabinet with covering elements (7, 9) and at least one cabinet door (1) attached to a body of the cabinet by hinges (4), wherein the cabinet door has a door frame (2) made of two vertical profiled elements (20) and two horizontal profiled elements (30) and connecting corner pieces (40), the switchgear cabinet comprising:
hinge receptacles, to which the hinges (4) are attached provided on or in the corner pieces (40), and
each of the vertical profiled elements (20) and the corner pieces (40) including a profiled section disposed along an outer side edge of the profiled section on a front side of the switchgear cabinet and which protrudes outward from a front face of the switchgear cabinet and beyond a front plane of a door opening of the switchgear cabinet, wherein the profiled section of each of the corner pieces (40) on at least one side of the switchgear cabinet includes one of the hinge receptacles and in which a rotational shaft of one of the hinges (4) is arranged.

* * * * *